3,340,150
HYPERTENSIVE COMPOSITIONS
George de Stevens and Lincoln Harvey Werner, Summit, N.J., assignors to Ciba Corporation, New York, N.Y., a corporation of Delaware
No Drawing. Filed Feb. 6, 1964, Ser. No. 343,113
10 Claims. (Cl. 167—65)

This application is in part a continuation of application Ser. No. 149,496, filed Nov. 2, 1961; which in turn is in part a continuation of application Ser. No. 791,799, filed Feb. 9, 1959; which in turn is in part a continuation of application Ser. No. 764,482, filed Sept. 29, 1958; which in turn is in part a continuation of application Ser. No. 751,620, filed July 29, 1958; which in turn is in part a continuation of application Ser. No. 740,582, filed June 9, 1958; which in turn is in part a continuation of application Ser. No. 727,242, filed Apr. 9, 1958; which in turn is in part a continuation of application Ser. No. 718,452, filed Mar. 3, 1958.

This invention relates to and has for its object the provision of compositions (and methods for their preparation) useful in the treatment of hypertension. These compositions contain essentially (1) dihydro benzothiadiazine-1,1-dioxides, (2) a 1-hydrazino-phthalazine and (3) an indole alkaloid of the Apocyneae family, such as reserpine, rescinnamine or deserpidine.

One may desirably use about 1 to about 20 percent of the dihydro benzothiadiazine-1,1-dioxide (e.g. 6-chloro-7-sulfamyl-3,4-dihydro-3-H-[1,2,4]-benzothiadiazine-1,1-dioxide or 2-, 3- or 2,3-lower alkyl, such as (1) 2-methyl, (2) 3-butyl, (3) 2,3-dimethyl, (4) 3-isobutyl or (5) 3-aryl lower alkyl, such as benzyl, phenethyl, etc., or other such substituted derivatives of 6-chloro-7-sulfamyl-3,4-dihydro-2-H-[1,2,4]-benzothiadiazine-1,1-dioxide to about 1 to about 60 percent of a 1-hydrazino-phthalazine, particularly 1-hydrazino-phthalazine, 1-hydrazino-4-methyl-phthalazine and 1,4-dihydrazino-phthalazine and about 0.005 to about 0.5 percent indole alkaloid, especially reserpine. Preferred proportions are about 1.5 to about 5.0 percent of the dihydro benzothiadiazine-1,1-dioxide to about 1.5 to about 15 percent of 1-hydrazino-phthalazine and about 0.01 to about 0.05 percent of indole alkaloid (particularly about 1.5 or 2.5 percent benzothiadiazine-1,1-dioxide to about 2.5 percent 1-hydrazino-phthalazine and about 0.01 percent indole alkaloid).

The tablet, capsule or pill provide a convenient oral form of administration of the compositions of the invention. These forms may be compounded to contain about 10 to about 200 mg. (more particularly, about 15 to about 50 mg.) dihydro benzothiadiazine-1,1-dioxide to about 10 to about 600 mg. (more particularly about 15 to about 150 mg.) 1-hydrazino-phthalazine and about 0.05 to about 5.0 mg. indole alkaloid (more particularly about 0.1 to about 0.5 mg.), particularly reserpine. Tablets may, of course, be scored to provide for fractional dosages, if desired. A complete tablet (or capsule) containing about 25 mg. 1-hydrazino-phthalazine, about 15 or 25 mg. dihydro benzothiadiazine-1,1-dioxide and about 0.1 mg. reserpine (or about 0.4 mg. rescinnamine) is convenient for administration and may normally be administered 1-3 times daily, but administration may vary with the needs of each particular patient and is best determined by the physician in each case.

The inert fillers and binders which are normally employed in the art of tablet (or capsule) making may be used in formulating tablets (or capsules). Examples of these materials are corn starch, lactose, stearic acid, talc, magnesium stearate, tragacanth, acacia, etc. The quantities of these ingredients may vary widely in accordance with the dictates of those skilled in the art, and depend largely upon the kind, i.e. soft or hard, and size of tablet which is required. Encapsulation may also be effected, using the same excipients as those used for tablets. At any rate, as has been indicated above, the compounding is effected in exactly the same manner as that normally employed in the art. Any compatible colors, approved and certified under the provisions of the Federal Food, Drug and Cosmetic Law, may be used for esthetic purposes or as a means of identification.

The 1-hydrazino-phthalazines are described in U.S. Patents Nos. 2,484,029 and 2,484,785 and the indole alkaloids, such as reserpine, rescinnamine and deserpidine, are also well known.

The diuretics used in the invention include benzothiadiazine-1,1-dioxides, more particularly, benz-sulfamyl-3, 4 - dihydro-2-H-[1,2,4]-benzothiadiazine-1,1-dioxides, in which the nitrogen atom of the sulfamyl group may be unsubstituted or substituted. In addition to the sulfamyl group the carbocyclic portion may contain the radical $R_3$, which may be hydrogen, lower hydrocarbon, substituted lower hydrocarbon, amino, nitro, etherified hydroxyl, sulfamyl, and particularly, halogen. The 3,4-dihydro-2-H-[1,2,4]-benzothiadiazine-1,1-dioxides of this invention include particularly the benz-N-$R_2'''$-sulfamyl-2-$R_2'$-3-$R_1$-4-$R_2''$-3,4-dihydro-2-H-[1,2,4]-benzothiadiazine-1,1-dioxides, in which the carbocyclic portion contains the above-defined radical $R_3$, and in which $R_1$ represents hydrogen, a hydrocarbon, a substituted hydrocarbon, a heterocyclic and a heterocyclic-lower alkyl radical, and each of the radicals $R_2'$, $R_2''$ and $R_2'''$ stands for hydrogen, hydrocarbon or substituted hydrocarbon. These compounds may, therefore, be represented by the following formula:

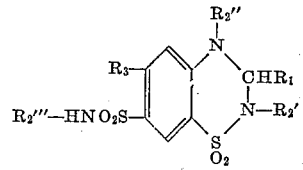

in which $R_1$ may represent hydrogen, or a hydrocarbon, a substituted hydrocarbon, a heterocyclic or a heterocyclic-lower hydrocarbon radical, each of the radicals $R_2'$, $R_2''$ and $R_2'''$ may be hydrogen, hydrocarbon or substituted hydrocarbon and $R_3$ may stand for lower aliphatic hydrocarbon, halogeno-substituted hydrocarbon and, particularly halogen.

Apart from being hydrogen, $R_1$ may also stand for aliphatic hydrocarbon radicals, for example, lower aliphatic hydrocarbon, such as lower alkyl, e.g. methyl, ethyl, propyl, isopropyl, butyl, isobutyl, secondary butyl, tertiary butyl, pentyl, isopentyl, neopentyl and the like, lower alkenyl, e.g. vinyl, 1-propenyl and the like, lower alkynyl, e.g. ethinyl and the like, carbocyclic aliphatic hydrocarbons, which contain from three to seven carbon atoms as ring members and in which the carbocyclic portions may be saturated or may contain from one to two double bonds depending on the number of ring carbon atoms, such as cycloalkyl, which contains from five to six ring carbon atoms, e.g. cyclopentyl or cyclohexyl, or cycloalkenyl, which contains from five to six carbon atoms as ring members, e.g. 2-cyclopentenyl, 3-cyclopentenyl, 2-cyclohexenyl, 3-cyclohexenyl and the like, or carbocyclic aliphatic hydrocarbon-lower aliphatic hydrocarbon, primarily carbocyclic alicyclic hydrocarbon-lower alkyl, which contains from three to seven carbon atoms as ring members and in which the carbocyclic portion may be saturated or contain from one to two double bonds depending on the number of ring carbon atoms, and in which lower alkyl represents a lower alkylene radical containing from one to seven, particularly from one to three, carbon atoms, such as cycloalkyl-lower alkyl radicals, which contain from five to six carbon atoms as ring members, e.g. cyclopentylmethyl, 1-cyclopentylethyl, 2-cyclopentylethyl, 1 - cyclopentylpropyl, 3 - cyclopentylpropyl, cyclohexylmethyl, 1-cyclohexylethyl, 2-cyclohexylethyl, 1-cyclohexylpropyl, 3-cyclohexylpropyl and the like, or cycloalkenyl-lower alkyl radicals, which contain from five to six ring carbon atoms, e.g.

2-cyclopentenylmethyl,
3-cyclopentenylmethyl,
1-(2-cyclopentenyl)-ethyl,
1-(3-cyclopentenyl)-ethyl,
2-(2-cyclopentenyl)-ethyl,
2-(3-cyclopentenyl)-ethyl,
1-(2-cyclopentenyl)-propyl,
1-(3-cyclopentenyl)-propyl
3-(2-cyclopentenyl)-propyl,
2-cyclohexenylmethyl,
3-cyclohexenylmethyl,
1-(2-cyclohexenyl)-ethyl,
1-(3-cyclohexenyl)-ethyl,
2-(2-cyclohexenyl)-ethyl,
2-(3-cyclohexenyl)-ethyl,
1-(2-cyclohexenyl)-propyl,
1-(3-cyclohexenyl)-propyl,
3-(2-cyclohexenyl)-propyl,
3-(3-cyclohexenyl)-propyl and the like.

These aliphatic hydrocarbon radicals may contain additional substituents. Such substituents are primarily attached to lower alkyl radicals, which may be represented by a lower alkylene radical containing from one to five carbon atoms, such as, for example, methylene, 1,1-ethylene, 1,2-ethylene, 1,1-dimethyl-1,2-ethylene, 1,1-propylene, 1,2-propylene, 1,3-propylene, 2,3-propylene, 2,2-propylene, 1,1-butylene, 1,2-butylene, 1,3-butylene, 1,4-butylene, 2,2-butylene, 2,3-butylene, 1,5-pentylene, 2,5-pentylene and the like.

Substituents are for example, one or more than one halogen atom, e.g. fluorine, bromine, or particularly chlorine; halogeno-substituted lower alkyl radicals, representing $R_1$, are, for example, chloromethyl, 2-chloroethyl, dichloromethyl, trichloromethyl, bromomethyl and the like.

Other substituents are amino groups, such as primary amino groups, secondary amino groups, such as lower alkyl-amino, e.g. methylamino or ethylamino, carbocyclic aryl-amino, e.g. phenylamino, or carbocyclic aryl-lower alkyl-amino, e.g. benzyl-amino, or primarily tertiary amino groups, particularly N,N-di-lower alkylamino, in which lower alkyl has from one to seven carbon atoms, e.g. dimethylamino, N-ethyl-N-methyl-amino, diethylamino, dipropylamino, di-isopropylamino, dibutylamino and the like, N-cycloalkyl-N-lower alkyl amino, e.g. N-cyclopentyl - N - methyl-amino, N-cyclohexyl-N-methylamino and the like, N-carbocyclic aryl-lower alkyl-N-lower alkyl-amino, e.g. N-benzyl-N-methyl-amino, N-methyl-N-(2-phenylethyl)-amino and the like, N,N-lower alkylene-imino group, in which the lower alkylene radical contains from four to six carbon atoms, such as pyrrolidino, e.g. pyrrolidino, 2-methyl-pyrrolidino and the like, piperidino, e.g. piperidino, 2-methyl-piperidino, 3-methyl-piperidino, 4-methyl-piperidino, 3-hydroxy-piperidino, 3-acetoxy-piperidino, 3-hydroxy-methyl-piperidino and the like, or hexamethylene-imino, N,N-lower oxa-alkylene-imino, in which oxa-alkylene contains preferably four carbon atoms, e.g. morpholino and the like, or N,N-lower aza-alkylene-imino, in which aza-alkylene contains preferably four carbon atoms, e.g. piperazino, 4-methyl-piperazino, 4-hydroxyethyl-piperazino, 4-acetoxyethyl-piperazino and the like. The tertiary amino group and the lower alkyl radical to which the amino group is attached may represent together a heterocyclic radical, in which the tertiary amino group is part of the heterocycle and one of the carbon atoms of the heterocyclic ring is connected directly or through a lower alkylene radical, e.g. methylene or 1,2-ethylene, with the 3-position of the 1,2,4-thiadiazine-1,1-dioxide portion. Such radicals are, for example, 1-methyl-3-piperidino-methyl, 2-(1-methyl-2-piperidino)-ethylene, 1-methyl-4-piperidino and the like.

Substituent attached to aliphatic hydrocarbon, particularly lower alkyl, radicals are also N-acylamino groups, in which acyl represents the acyl radical of an organic corboxylic acid, for example, a substituted carbonic acid, e.g. methoxy-carbonic acid, ethoxy-carbonic acid, benzyloxy-carbonic acid and the like, a lower aliphatic carboxylic acid, such as a lower alkanoic acid, e.g. acetic, propionic, pivalic acid and the like, lower alkenoic acids, e.g. acrylic, methylacrylic acid and the like, lower aliphatic dicarboxylic acids, e.g. oxali, malonic, succinic, glutaric, adipic, malei, fumaric acid and the like, or their halfesters with lower alkanols, e.g. methanol, ethanol and the like, carbocyclic aryl-carboxylic acids, particularly monocylcic carboyxlic aryl-carboxylic acids, e.g. benzoic or substituted benzoic acids, carbocyclic aryl-lower aliphatic carboxylic acids, particularly monocyclic carbocyclic aryl-lower alkyl carboxylic acids, e.g. phenylacetic, dihydrocinnamic acid and the like, which may contain additional substituents in the aromatic portion, or monocyclic carbocyclic aryl-lower alkenyl carboxylic acids, e.g. cinnamic acid or substituted cinammic acids; substituents attached to these carboxylic acids are, for example, lower alkyl, e.g. methyl, ethyl and the like, lower alkoxy, e.g. methoxy, ethoxy and the like, lower alkylenedioxy, e.g. methylenedioxy, nitro, amino, particularly tertiary amino, such as N,N-di-lower alkyl-amino, e.g. dimethylamino, diethylamino and the like, halogen, e.g. fluorine, chlorine, bromine and the like, or halogeno-lower alkyl, e.g. trifluoromethyl.

Acyl groups are additional substituents of aliphatic hydrocarbon, particularly lower alkyl, radicals, primarily acyl radicals of organic carboxylic acids, such as lower alkanoic acid, e.g. acetic, propionic, butyric acid and the like, as well as substituted carbonic acids, e.g. methoxy-carbonic acid, ethoxy-carbonic acid, benzyloxy-carbonic acid and the like, lower alkenoic acids, e.g. acrylic, methacrylic acid and the like, lower aliphatic dicarboxylic acids, e.g. oxalic, malonic, succinic, glutaric, adipic, maleic, fumaric acid and the like, or their halfesters wtih lower alkanols, e.g. methanol, ethanol and the like, carbocyclic aryl-carboxylic acids, primarily monocyclic carbocyclic aryl-carboxylic acids, e.g. benzoic or substituted benzoic acids, carbocyclic aryl-lower aliphatic carboxylic acids, primarily monocyclic carbocyclic aryl-lower alkyl carboxylic acids, e.g. phenylacetic, dihydrocinnamic acid and the like, which may contain additional substituents in the aromatic portion, or monocyclic carbocyclic aryl-lower alkenyl carboxylic acids, e.g. cinnamic acid and the like, or substituted cinnamic acids. Additional substituents of these carboxylic acids are, for example, lower alkyl, e.g. methyl, ethyl and the like, lower alkoxy, e.g. methoxy, ethoxy and the like, lower alkylenedioxy, e.g. methylenedioxy, nitro, amino, particularly tertiary amino, such as di-lower alkylamino and the like, halogen, e.g. fluorine, chlorine, bromine and the like, or halogeno-lower alkyl, e.g. trifluoromethyl.

Other substituents attached to aliphatic hydrocarbon, particularly lower alkyl, radicals, are hydroxyl groups. Esterified hydroxyl groups may also be suitable as substituents, especially hydroxyl groups esterified by organic carboxylic acids, for example, substituted carbonic acids, e.g. methoxy-carbonic acid, ethoxy-carbonic acid, benzyl-oxy-carbonic acid and the like, lower aliphatic carboxylic acids, such as lower alkanoic acids, e.g. acetic, propionic, pivalic acid and the like, lower alkenoic acids, e.g. acrylic, methylacrylic acid and the like, lower aliphatic dicarboxylic acids, e.g. oxalic, malonic, succinic, glutaric, adipic, maleic, fumaric acid and the like, or their halfesters with lower alkanols, e.g. methanol, ethanol and the like, carbocyclic aryl-carboxylic acids, primarily monocyclic carbocyclic aryl-carboxylic acids, e.g. benzoic or substituted benzoic acids, carbocyclic aryl-lower aliphatic carboxylic acids, primarily monocyclic carbocyclic aryl-lower alkyl carboxylic acids, e.g. phenylacetic, dihydrocinnamic acid and the like, which may contain additional substituents in the aromatic portion, or monocyclic carbocyclic aryl-lower alkenyl carboxylic acids, e.g. cinnamic acid and the like, or substituted cinnamic acids; substituents of such acids are, for example, lower alkyl, e.g. methyl, ethyl and the like, lower alkoxy, e.g. methoxy, ethoxy and the like, lower alkylenedioxy, e.g. methylenedioxy, nitro, amino, particularly tertiary amino, such as di-lower alkyl-amino and the like, halogen, e.g. fluorine, chlorine, bromine and the like, or halogeno-lower alkyl, e.g. trifluoromethyl.

Further substituents of aliphatic hydrocarbon radicals, particularly lower alkyl radicals, are etherified hydroxyl groups, which may be represented, for example, by aliphatic hydrocarbonoxy, such as lower alkoxy, e.g. methoxy, ethoxy, n-propyloxy, isopropyloxy, n-butyloxy, isobutyloxy and the like, lower alkenyloxy, e.g. vinyloxy, allyloxy and the like, carbocyclic aryloxy, such as monocyclic carbocyclic aryloxy, e.g. phenyloxy or substituted phenyloxy, or bicyclic carbocyclic aryloxy, e.g. 1-naphthyloxy or 2-naphthyloxy or substituted naphthyloxy, or carbocyclic aryl-aliphatic hydrocarbonoxy, such as monocyclic carbocyclic aryloxy, e.g. phenyloxy or substituted phenyloxy, or bicyclic carbocyclic aryloxy, e.g. 1-naphthyloxy or 2-naphthyloxy or substituted naphthyloxy, or carbocyclic arylaliphatic hydrocarbonoxy, such as monocyclic carbocyclic aryl-lower alkoxy, e.g. benzyloxy or substituted benzyloxy. The aliphatic hydrocarbon, and particularly the carbocyclic aryl portions of the etherified hydroxyl groups may contain additional substituents; such substituents are, for example, lower alkyl, e.g. methyl, ethyl and the like, lower alkoxy, e.g. methoxy, ethoxy and the like, lower alkylenedioxy, e.g. methylenedioxy, nitro, amino, particularly tertiary amino, such as N,N-di-lower alkyl-amino, e.g. dimethylamino, diethylamino and the like, halogen, e.g. fluorine, chlorine, bromine and the like, or halogeno-lower alkyl, e.g. trifluoromethyl.

In addition, aliphatic hydrocarbon, particularly lower alkyl, radicals may be substituted by an etherified mercapto group, for example, aliphatic hydrocarbon-mercapto, such as lower alkyl-mercapto, methyl-mercapto, ethyl-mercapto, n-propyl-mercapto, isopropyl-mercapto, n-butyl-mercapto, isobutyl-mercapto and the like, lower aylkenyl-mercapto, e.g. vinyl-mercapto, allyl-mercapto and the like, carbocyclic aryl mercapto, such as monocyclic carbocyclic aryl-mercapto, e.g. phenyl-mercapto or substituted phenylmercapto, or bicyclic carbocyclic aryl-mercapto, e.g. 1-naphthyl-mercapto or 2-naphthyl-mercapto or substituted naphthyl-mercapto, or carbocyclic aryl-aliphatic hydrocarbon-mercapto, primarily monocyclic carbocyclic aryl-lower alkyl-mercapto, e.g. benzyl-mercapto, 1-phenyl-ethyl-mercapto, 2-phenyl-ethyl-mercapto and the like, or substituted benzyl-mercapto, substituted 1-phenyl-ethyl-mercapto, substituted 2-phenyl-ethyl-mercapto and the like. The aliphatic hydrocarbon portions and, particularly, the carbocyclic aryl portions of the etherified mercapto groups may contain additional substituents; such substituents are, for example, lower alkyl, e.g. methyl, ethyl and the like, lower alkoxy, e.g. methoxy, ethoxy and the like, lower alkylenedioxy, e.g. methylenedioxy, nitro, amino, such as primary or secondary amines, or, particularly, tertiary amino, such as N,N-di-lower alkyl-amino, e.g. dimethylamino, diethylamino and the like, or N,N-lower alkylene-imino, e.g. pyrrolidino, piperidino and the like, halogen, e.g. fluorine, chlorine, bromine and the like, halogeno-lower alkyl, e.g. trifluoromethyl. These substituents may be attached to any of the available positions; for example, monocyclic carbocyclic aryl radicals may be substituted in the ortho-, meta- or para-positions, whereby one or more than one of the same or of different substituents may be present.

Apart from aliphatic hydrocarbon radicals $R_1$ may represent carbocyclic aryl groups, such as monocyclic carbocyclic aryl, e.g. phenyl or substituted phenyl, or monocyclic carbocyclic aryl, e.g. 1-naphthyl or 2-naphthyl or substituted naphthyl radicals, or carbocyclic aryl-aliphatic hydrocarbon radicals, particularly monocyclic or bicyclic carbocyclic aryl-lower alkyl, e.g. benzyl, 1-phentylethyl, 2-phentylethyl, 3-phenylpropyl, 1-naphthylmethyl and the like or these radicals substituted in the carbocyclic aryl portion, or monocyclic or bicyclic carbocyclic aryl-lower alkenyl, e.g. 2-phenyl-ethenyl and the like, as well as such radicals containing in the carbocyclic portion additional substituents. Such substituents are, for example, lower alkyl, e.g. methyl, ethyl and the like, lower alkoxy, e.g. methoxy, ethoxy and the like, lower alkylenedioxy, e.g. methylenedioxy, lower alkyl mercapto, e.g. methylmercapto and the like, sulfamyl, amino, particularly tertiary amino, such as N,N-di-lower alkyl-amino, e.g. dimethylamino and the like, halogen, e.g. fluorine, chlorine, bromine and the like, or halogeno-lower alkyl, e.g. trifluoromethyl.

Additional groups representing $R_1$ are heterocyclic aryl radicals, particularly monocyclic or bicyclic heterocyclic aryl radicals, such as pyridyl, e.g. 2-pyridyl, 3-pyridyl or 4-pyridyl, thienyl, e.g. 2-thienyl, furyl, e.g. 2-furyl, or quinolyl, e.g. 6-quonolyl and the like or heterocyclic aryl-aliphatic hydrocarbon, such as monocyclic heterocyclic aryl-lower alkyl, for example, thenyl, e.g. 2-thenyl and the like. These radicals may contain additional substituents, particularly lower alkyl, e.g. methyl, ethyl and the like, lower alkoxy, e.g. methoxy, ethoxy and the like, or halogen, e.g. fluorine, chlorine, bromine and the like.

The radicals $R_2'$, $R_2''$ and $R_2'''$, apart from being primarily hydrogen, may also represent lower aliphatic hydrocarbon radicals, such as lower alkyl, e.g. methyl, ethyl, propyl or isopropyl; monocyclic or bicyclic carbocyclic aryl, e.g. phenyl or 1- or 2-naphthyl; monocyclic or bicyclic carbocyclic aryl-lower alkyl, e.g. benzyl, 1-naphthyl-methyl or 2-naphthyl-methyl; or these radicals containing substituents, such as those specifically mentioned for the radical $R_1$; substituted radicals are, for example, hydroxymethyl, hydroxyethyl or similar radicals.

The radical $R_3$ stands primarily for halogen, e.g. fluorine, bromine, iodine or, particularly, chlorine. In addition, it may also represent lower aliphatic hydrocarbon, for example, lower alkyl, e.g. methyl, ethyl and the like, or a substituted lower aliphatic hydrocarbon, such as halogeno-lower alkyl radical, e.g. trifluoromethyl.

Salts of the diuretics which may be used in this invention are therapeutically useful salts with metals, particularly the alkali metal salts, such as those with sodium or potassium. Mono- or poly-salts may be formed.

Diuretics, particularly useful in the invention, are the 3,4-dihydro-2-H-[1,2,4]-benzothiadiazine - 1,1 - dioxides of the formula

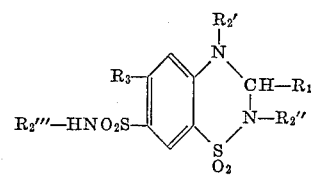

in which $R_1$ stands for hydrogen, lower alkyl, halogeno-lower alkyl, N,N-di-lower alkyl-amino-lower alkyl, lower alkanoyl-lower alkyl, lower alkoxy-lower alkyl, monocyclic carbocyclic aryloxy-lower alkyl, lower alkylmercapto-lower alkyl, monocyclic aryl-mercapto-lower alkyl, monocyclic aryl-lower alkylmercapto-lower alkyl or monocyclic carbocyclic aryl-lower alkyl, $R_2'$, $R_2''$ and $R_2'''$ represent hydrogen or lower alkyl, e.g. methyl, and $R_3$ stands for halogen, particularly chlorine, lower alkyl, e.g. methyl, or halogeno-lower alkyl, e.g. trifluoromethyl. Representative of this group of compounds are the 3,4- dihydro-2-H-[1,2,4]-benzothiadiazine-1,1-dioxides of the formulae

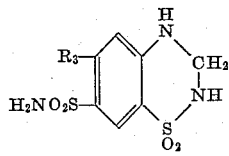

in which $R_3$ stands for halogen, particularly chlorine,

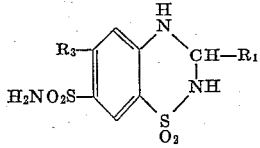

in which $R_1$ stands for lower alkyl or aryl-lower alkyl, and $R_3$ represents halogen, particularly chlorine,

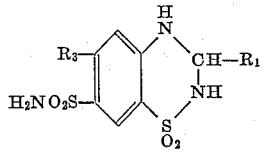

in which $R_1$ stands for halogeno-lower alkyl, and $R_3$ represents halogen, particularly chlorine or halogeno-lower alkyl, particularly trifluoromethyl, and

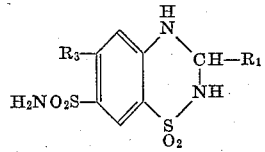

in which $R_1$ stands for monocyclic carbocyclic aryl-lower akyl, and $R_3$ stands for halogen, especially for chlorine, and those derivatives of these compounds, in which one, two or all three of the nitrogen atoms are substituted by lower alkyl, particularly methyl. Acylated 1,2,4-benzothiadiazine derivatives are particularly those acylated with acyl radicals of carbonic acids, e.g. ethyl carbonic acid, or lower alkanoic acids, e.g. acetic acid,

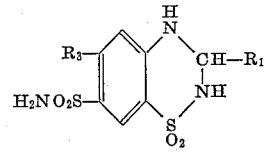

wherein $R_1$ represents an amino-lower alkyl radical, and $R_3$ represents halogen, particularly chlorine,

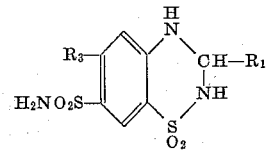

wherein $R_1$ represents hydroxy-lower alkyl, acyloxy-lower alkyl or etherified lower alkyl and $R_3$ represents halogen, particularly chlorine,

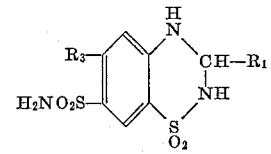

wherein $R_1$ represents a carboxylic alicyclic hydrocarbon radical or a carbocyclic alicyclic hydrocarbon-lower aliphatic hydrocarbon radical, and $R_3$ represents halogen, particularly chlorine,

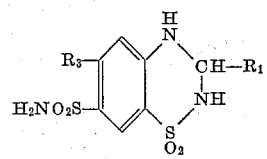

wherein $R_1$ represents an etherified mercapto-lower alkyl group and $R_3$ represents halogen, particularly chlorine.

The benz-sulfamyl-3,4-dihydro-2-H-[1,2,4] - benzothiadiazine-1,1-dioxides used in this invention, in which the nitrogen atom of the sulfamyl group is unsubstituted or substituted, may be prepared by treating a benz-sulfamyl-2-sulfamyl-aniline compound, in which the nitrogen atoms of the sulfamyl groups may be unsubstituted or substituted, with an aldehyde. For example, the benz-N-$R_2'''$-sulfamyl-2-$R_2'$-3-$R_1$-4-$R_2''$-3,4 - dihydro-2-H-[1,2,4] - benzothiadiazine-1,1-dioxides, in which $R_1$, $R_2'$, $R_2''$ and $R_2'''$ have the above-given meaning, and in which the carbocyclic portion contains $R_3$ of the above-given meaning as a further substituent, the acylated derivatives and salts thereof, may be prepared by treating an aniline compound of the formula

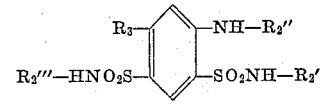

in which $R_2'$, $R_2''$, $R_2'''$ and $R_3$ have the above-given meaning, or a salt thereof, with an aldehyde of the formula $R_1CHO$, in which $R_1$ has the above-given meaning, and, if desired, replacing in any resulting 3,4-dihydro-2-H-[1,2,4]-benzothiadiazine-1,1-dioxide containing sulfamyl-nitrogen atoms with hydrogen, such hydrogen by hydrocarbon, and/or, if desired, converting a resulting 3,4-dihydro-2-H-[1,2,4]-benzothiadiazine-1,1-dioxide into its acylated derivative, and/or, if desired, converting a resulting salt into a free compound, and/or, if desired, converting a free compound into a salt thereof.

A salt of the aniline derivative used as the starting material may be a salt with an alkali metal or an acid addition salt. Preferably, the aldehyde is reacted with the aniline derivative in about stoichometrc amounts and in the presence of a small amount of an acid, particularly a mineral acid, such as hydrohalic acid, e.g. hydrochloric or hydrobromic acid, or sulfuric acid, if desired, in anhydrous form. The aldehyde may also be given into the reaction medium in a form which yields the desired reactant in situ. Thus, for example, when formaldehyde is used as the reactant, it may be desirable to use it in the form of a polymer, such as paraformaldehyde or trioxane, or as an acetal, such as dimethoxymethane or diethoxymethane. Other aldehydes may be used as acetals, such as 1,1-dimethoxy-ethane or 1,1-diethoxy-ethane. The reaction may be carried out in the absence or preferably in the presence of a solvent, for example, an ether, e.g. p-dioxane or diethyleneglycol dimethylether, or a formamide, e.g. dimethylformamide. It may be completed at an elevated temperature, for example, at the boiling temperature of the solvent. Thus, the aldehyde reactant is, for example, added to a preheated solution of the aniline derivative in the solvent containing the acid and heating may then be continued to complete the reaction. If necessary, the reaction may be performed under increased pressure or in the atmosphere of an inert gas, e.g. nitrogen.

Illustrating this generally applicable process is the treatment of a 5-$R_3$-2-(N-$R_2'$-sulfamyl)-4-(N-$R_2'''$-sulfamyl)-N-$R_2''$-aniline, in which $R_3$ represents halogen, lower alkyl or halogeno-lower alkyl, and each of the radicals $R_2'$, $R_2''$ and $R_2'''$ represents hydrogen or lower alkyl, with an aldehyde of the formula $R_1$—CHO, in which $R_1$ represents hydrogen, lower alkyl, halogeno-lower alkyl, monocyclic carbocyclic aryl or monocyclic carbocyclic aryl-lower akyl, in the presence of a small amount of a mineral acid, to form 2-R$_2$'-2-R$_1$-4-R$_2$''-6-R$_3$-7-(N-R$_2$'''-sulfamyl)-3,4-dihydro-2-H-[1,2,4]-benzothiadiazine - 1,1 - dioxides, in which R$_1$, R$_2$', R$_2$'', R$_2$''' and R$_3$ have the above-given preferred meaning. For example, the 6-chloro-7-sulfamyl-3,4-dihydro-2-H-[1,2,4]-benzothiadiazine-1,1-dioxide may be prepared by reacting 5-chloro-2,3-disulfamylaniline with an about equivalent amount of paraformaldehyde or aqueous formaldehyde in the presence of a small amount of hydrochloric acid.

More specifically, these compounds may be prepared as shown in the recited examples of copending application Ser. No. 764,482, of common assignment, two of which are given below:

EXAMPLE A

A mixture of 2.9 g. of 5-chloro-2,4-disulfamyl-aniline in 15 ml. of anhydrous diethyleneglycol dimethylether, 0.5 ml. of an ethyl acetate solution containing 109.5 g. of hydrogen chloride per 1000 ml. and 0.33 g. (0.011 mol) of paraformaldehyde is heated to 80–90° C. and maintained at that temperature for one hour. The resulting mixture is cooled to room temperature and concentrated to one third of its volume under reduced pressure, diluted with water, then allowed to crystallize. The product is filtered off and recrystallized from water, to yield the desired 6-chloro-7-sulfamyl-3,4-dihydro-2-H-[1,2,4]-benzothiadiazine-1,1-dioxide, M.P. 266–268° C.; yield: 1.4 g.

By replacing paraformaldehyde by 0.84 g. of 1,1-dimethoxymethane and proceeding as above, the same compound is obtained.

EXAMPLE B

A mixture of 2.9 g. of 5-chloro-2,4-disulfamyl-aniline in 20 ml. of anhydrous diethyleneglycol dimethylether, 0.44 g. of acetaldehyde and 0.5 ml. of a solution of hydrogen chloride in ethyl acetate (109.5 g. hydrogen chloride per 1000 ml.) is heated to 80–90° C. and maintained at this temperature for one hour. The reaction mixture is concentrated under reduced pressure; on addition of water, the product separates and is then recrystallized from ethanol or aqueous ethanol to yield 1.2 g. of the desired 6-chloro-3-methyl-7-sulfamyl-3,4-dihydro-2-H-[1,2,4]-benzothiadiazine-1,1-dioxide, M.P. 258–260° C.

The same product is obtained by replacing the acetaldehyde by 0.9 g. of 1,1-dimethoxyethane or by 1.2 g. of 1,1-diethoxyethane.

Following are working examples, illustrative of, but in no way intended to limit the present invention. Unless otherwise indicated, all parts, wherever given in the specification, are parts by weight. All sieve sizes are U.S. Standard sieve sizes.

EXAMPLE 1

Core—Material and formula, 15,000 tablets

| | Grams |
|---|---|
| 1-hydrazino-phthalazine | 375.00 |
| Reserpine | 1.50 |
| Polyethylene glycol 6000 | 75.00 |
| Lactose, USP | 1033.50 |
| Magnesium stearate, USP | 15.00 |
| 50% 3A alcohol | Q.s. |

*Procedure for preparation.*—Triturate the reserpine with 100 grams of lactose and force the mixture through a No. 50 screen. Add the remainder of the lactose, the 1-hydrazino-phthalazine and the magnasium stearate and mix. Dissolve the polyethylene glycol in 90 ml. of 50% 3A alcohol and granulate the mixed powders with it, using additional 50% 3A alcohol if necessary. Pass the moist mass through a No. 10 screen and dry to 2 percent moisture, using circulating air at 110° F. Break the granules on a No. 20 screen and compress into tablets weighing 100 mg., using 5/32 inch punches and dies on Manesty Drycota tablet press.

Coating—Material and formula, 15,000 tablets

| | Grams |
|---|---|
| 6 - chloro - 3,4 - dihydro-7-sulfamyl-2H-1,2,4-benzothiadiazine - 1,1 - dioxide (hydrochlorothiazide | 225.00 |
| Confectioners' sugar | 150.00 |
| Polyethylene glycol 4000 monostearate | 30.00 |
| Talcum, USP | 150.00 |
| Magnesium stearate, USP | 30.00 |
| Corn starch | 150.00 |
| Lactose, spray dried | 2264.85 |
| FD & C Red No. 4 | 0.15 |
| 50% 3A alcohol | Q.s. |

*Procedure for preparation.*—Mix together the hydrochlorothiazide confectioners' sugar, lactose spray dried, talc, corn starch and magnesium stearate. Dissolve the color in 150 ml. of 50% 3A alcohol and then the polyethyleneglycol. Granule the mixed powders with this solution, using additional 50% 3A alcohol if necessary. Pass the moist mass through a No. 10 screen and dried to 3 percent moisture at 110° F. with circulating air. Break granules on a No. 14 screen and compress 200 mg. of this material around each core tablet, using 11/32 inch punches and dies on the Manesty Drycota tablet press.

EXAMPLE 2

Material and formula, 10,000 tablets

| | Grams |
|---|---|
| 6 - chloro - 3,4 - dihydro-7-sulfamyl-2H,1,2,4-benzothiadiazine - 1,1 - dioxide (hydrochlorothiazide) | 250.00 |
| 1-hydrazino-phthalazine | 250.00 |
| Reserpine | 2.50 |
| Lactose, USP | 2212.50 |
| Polyethylene glycol 4000 | 120.00 |
| Talc, USP | 150.00 |
| Magnesium stearate, USP | 15.00 |
| 50% 3A alcohol | Q.s. |

*Procedure for preparation.*—Triturate the reserpine with 100 grams of lactose and force through a No. 50 screen. Combine with the hydrochlorothiazide, 1-hydrazino-phthalazine, talc, magnesium stearate and the remainder of the lactose. Dissolve the polyethylene glycol in 180 ml. of 50% 3A alcohol, using heat. Granulate the mixed powders with this solution, using additional 50% 3A alcohol, if necessary, to complete the granulation. Pass the moist mass through a No. 8 screen and dry with circulating air at 100° F. until the moisture content is about 3 percent. Break the granules on a No. 14 screen and compress into tablets weighing 300 mg., using 12/32 inch punches and dies.

EXAMPLE 3

Material and formula, 10,000 tablets

| | Grams |
|---|---|
| 6 - chloro - 3,4 - dihydro-7-sulfamyl-2H-1,2,4-benzothiadiazine - 1,1 - dioxide (hydrochlorothiazide) | 150.00 |
| Reserpine | 2.00 |
| 1-hydrazino-phthalazine | 500.00 |
| Lactose, USP | 2018.00 |
| Tragacanth, USP | 75.00 |
| 50% 3A alcohol | Q.s. |
| Corn starch | 150.00 |
| Talc, USP | 90.00 |
| Magnesium stearate, USP | 15.00 |

*Pocedure for preparation.*—Triturate the reserpine with 100 grams of lactose and force through a No. 50 screen. Combine this mixture with the hydrochlorothiazide, 1-hydrazino-phthalazine, tragacanth and the remainder of the lactose and mix thoroughly. Granulate the mixed powders with the 50% 3A alcohol. Press the moist mass through a No. 8 screen and dry with circulating air at 100° F. until the moisture content is about 3.5 percent.

Break the granules on a No. 12 screen and mix them with the corn starch, talc and magnesium stearate. Compress into tablets weighing 300 mg., using 12/32 inch punches and dies.

EXAMPLE 4

*Material and formula, 10,000 tablets*

| | Grams |
|---|---|
| 6 - chloro - 3,4 - dihydro-7-sulfamyl-2H-1,2,4-benzothiadiazine - 1,1 - dioxide (hydrochlorothiazide) | 250.00 |
| Reserpine triturate 5% | 40.00 |
| 1-hydrazino-phthalazine | 500.00 |
| Gelatin | 60.00 |
| Purified water | Q.s. |
| Corn starch | 150.00 |
| Lactose, USP | 1835.00 |
| Magnesium stearate, USP | 15.00 |
| Talc, USP | 150.00 |

*Procedure for preparation.*—Mix together the hydrochlorothiazide, reserpine triturate, 1-hydrazino-phthalazine and lactose. Dissolve the gelatin in 300 ml. of purified water, using heat. Granulate the mixed powders with the resultant solution, using additional purified water if necessary. Pass the moist mass through a No. 8 screen and dry with circulating air at 100° F. until moisture content is 2 percent. Break the granules on a No. 12 screen and mix them with corn starch, talc and magnesium stearate. Compress into tablets weighing 300 mg., using 12/32 inch punches and dies.

EXAMPLE 5

*Core—Material and formula, 10,000 tablets*

| | Grams |
|---|---|
| 1-hydrazino-phthalazine | 100.00 |
| Mannitol | 590.00 |
| Gelatin | 15.00 |
| Purified water | Q.s. |
| Talc, USP | 37.50 |
| Magnesium stearate, USP | 7.50 |

*Procedure for preparation.*—Mix thoroughly the 1-hydrazino-phthalazine and mannitol. Dissolve the gelatin in 75 ml. purified water, using heat. Granulate the mixed powders with the gelatin solution, using additional purified water as required. Pass the moist mass through a No. 8 screen and dry at 110° F. until moisture content is 1 percent. Break the granules on a No. 20 screen and mix with the talc and magnesium stearate. Compress into core tablets weighing 75 mg., using 7/32 inch punches and dies on a Manesty Drycota tablet press.

*Coating—Material and formula, 10,000 tablets*

| | Grams |
|---|---|
| 6 - chloro - 3,4 - dihydro-7-sulfamyl-2H-1,2,4-benzothiadiazine - 1,1 - dioxide (hydrochlorothiazide | 100.00 |
| Reserpine triturate 5% | 10.00 |
| Lactose, spray dried | 1307.90 |
| Corn starch (anhydrous basis) | 67.10 |
| Stearic acid powder, USP | 15.00 |
| Purified water | Q.s. |
| 50% 3A alcohol | Q.s. |

*Procedure for preparation.*—Mix together hydrochlorothiazide, reserpine triturate, lactose, 38.5 grams corn starch and stearic acid. Suspend 28.6 grams corn starch in 40 ml. purified water and make a paste by adding 200 ml. boiling water. Granulate the powders with this paste, using a mixture of equal parts of alcohol and water to complete the granulation. Pass the moist mass through a No. 8 screen and dry at 100° F. with circulating air. Break the granules on a No. 14 screen and compress 150 mg. of this material around the core tablets, using 10/32 inch punches and dies on a Manesty Drycota tablet press.

EXAMPLE 6

*Material and formula, 10,000 tablets*

| | Grams |
|---|---|
| 6 - chloro - 3,4 - dihydro-7-sulfamyl-2H-1,2,4-benzothiadiazine - 1,1 - dioxide (hydrochlorothiazide) | 150.00 |
| 1-hydrazino-phthalazine | 1500.00 |
| Reserpine | 2.50 |
| Lactose, USP | 1062.50 |
| Polyethylene glycol 4000 | 120.00 |
| Talc, USP | 150.00 |
| Magnesium stearate, USP | 15.00 |
| 50% 3A alcohol | Q.s. |

*Procedure for preparation.*—Triturate the reserpine with 100 grams of lactose and force through a No. 50 screen. Combine with the hydrochlorothiazide, 1-hydrazino-phthalazine, talc, magnesium stearate and the remainder of the lactose. Dissolve the polyethylene glycol in 180 ml. of 50% 3A alcohol, using heat. Granulate the mixed powders with this solution, using additional 50% 3A alcohol, if necessary, to complete the granulation. Pass the moist mass through a No. 8 screen and dry with circulating air at 100° F. on a No. 14 screen and compress into tablets weighing 300 mg., using 12/32 inch punches and dies.

EXAMPLE 7

Using a procedure identical with that given in Example 1, but substituting an equivalent amount of deserpidine (or rescinnamine) for the reserpine of the reference example, one obtains an analgous composition.

EXAMPLE 8

Using a procedure identical with that given in Example 2, but sustituting an equivalent amount of 1,4-dihydrazino-phthalazine for the 1-hydrazino-phthalazine in the reference example, one obtains an analogous composition.

EXAMPLE 9

Using a procedure identical with that given in Example 3, but substituting and equivalent amount of deserpidine (or rescinnamine) for the reserpine of the reference example and an equivalent amount of 1,4-dihydrazino-phthalazine for the 1-hydrazino-phthalazine of the reference example, one obtains an analgous composition.

This invention may be variously otherwise embodied within the scope of the appended claims. Thus, one may substitute an equivalent amount of any of the diuretic benzothiadiazine-1,1-dioxides disclosed herein for that shown in any of the working examples to obtain analogous compositions.

What is claimed is:

1. A pharmaceutical composition, in oral dosage unit form, comprising essentially about 1 to about 20 per cent of 2-$R_2'$-3-$R_1$ - 4-$R_2''$-6 - $R_3$ - 7-(N - $R_2'''$-sulfamyl)-3,4-dihydro - 2-H-[1,2,4]-benzothiadiazine - 1,1 - dioxide, in which $R_1$ represents a member of the group consisting of hydrogen, lower alkyl, halogeno-lower alkyl, monocyclic carbocyclic aryl and monocyclic carbocyclic aryl-lower alkyl, $R_2'$ stands for a member of the group consisting of hydrogen and lower alkyl $R_2''$ and $R_2'''$ stand for hydrogen and $R_3$ stands for halogeno-lower alkyl, about 1 to about 60 per cent of a 1-hydrazino-phthalazine selected from the group consisting of 1-hydrazino-phthalazine, 1-hydrazino-4-methyl-phthalazine and 1,4 - dihydrazino-phthalazine, and about 0.005 to about 0.5 percent indole alkaloid selected from the group consisting of reserpine, deserpidine and rescinnamine.

2. A pharmaceutical composition, in oral dosage unit form, comprising essentially about 1.5 to about 5 percent of 2-$R_2'$-3-$R_1$-4-$R_2''$-6-$R_3$-7-(N-$R_2'''$-sulfamyl) - 3,4-dihydro - 2-H-[1,2,4]-benzothiadiazine - 1,1 - dioxide, in which $R_1$ represents a member of the group consisting of hydrogen, lower alkyl, halogeno-lower alkyl, monocyclic carbocyclic aryl and monocyclic carbocyclic aryl-lower alkyl, $R_2'$ stands for a member of the group consisting of hydrogen and lower alkyl, $R_2''$ and $R_2'''$ stand for hydrogen and $R_3$ stands for halogeno-lower alkyl, aobut 1.0 to about 15 percent of a 1-hydrazino-phthalazine, selected from the group consisting of 1-hydrazino-phthalazine, 1-hydrazino-4-methyl - phthalazine and 1,4 - dihydrazino-phthalazine, and about 0.01 to about 0.05 percent indole alkaloid selected from the group consisting of reserpine, deserpidine and rescinnamine.

3. A pharmaceutical composition, in oral dosage unit form, comprising essentially about 10 to about 200 milligrams of 2-$R_2'$-3-$R_1$-4-$R_2''$-6-$R_3$-7-(N-$R_2'''$-sulfamyl)-3,4-dihydro - 2-H-[1,2,4]-benzothiadiazine - 1,1 - dioxide, in which $R_1$ represents a member of the group consisting of hydrogen, lower alkyl, halogeno-lower alkyl, monocyclic carbocyclic aryl and monocyclic carbocyclic aryl-lower alkyl, $R_2'$ stands for a member of the group consisting of hydrogen and lower alkyl, $R_2''$ and $R_2'''$ stand for hydrogen $R_3$ stands for halogen-lower alkyl, about 10 to about 600 milligrams of a 1-hydrazino-phthalazine selected from the group consisting of 1-hydrazino-phthalazine, 1-hydrazino-4-methyl-phthalazine and 1,4-dihydrazino-phthalazine, and about 0.05 to about 5.0 milligrams indole alkaloid selected from the group consisting of reserpine, deserpidine and rescinnamine.

4. A pharmaceutical composition, in oral dosage unit form, comprising essentially about 15 to about 50 milligrams of 6-trifluoromethyl-7-sulfamyl-3,4-dihydro-2-H-[1,2,4]-benzothiadiazine-1,1-dioxide, about 15 to about 150 milligrams of a 1-hydrazino-phthalazine selected from the group consisting of 1-hydrazino-phthalazine, 1-hydrazino-4-methyl-phthalazine and 1,4-dihydrazino-phthalazine, and about 0.1 to about 0.5 milligram indole alkaloid selected from the group consisting of reserpine, deserpidine and rescinnamine.

5. A pharmaceutical composition, in oral dosage unit form, comprising essentially about 20 to about 100 milligrams of 6-lower alkyl-7-sulfamyl-3,4-dihydro-2-H-[1,2,4]-benzothiadiazine-1,1-dioxide, about 15 to about 150 milligrams of a 1-hydrazino-phthalazine selected from the group consisting of 1-hydrazino-phthalazine, 1-hydrazino-4-methyl-phthalazine and 1,4-dihydrazino-phthalazine, and about 0.1 to about 0.5 milligram indole alkaloid selected from the group consisting of reserpine, deserpidine and rescinnamine.

6. A pharmaceutical composition, in oral dosage unit form, comprising essentially about 10 to about 200 milligrams of 2-lower alkyl-6-chloro-7-sulfamyl-3,4-dihydro-2-H-[1,2,4]-benzothiadiazine-1,1-dioxide, about 10 to about 600 milligrams of a 1-hydrazino-phthalazine selected from the group consisting of 1-hydrazino-phthalazine, 1-hydrazino-4-methyl-phthalazine and 1,4-dihydrazino-phthalazine, and about 0.05 to about 5.0 milligrams indole alkaloid selected from the group consisting of reserpine, deserpidine and rescinnamine.

7. A pharmaceutical composition, in oral dosage unit form, comprising essentially about 10 to about 200 milligrams of 3-lower alkyl-6-chloro-7-sulfamyl-3,4-dihydro-2-H-[1,2,4]-benzothiadiazine-1,1-dioxide, about 10 to about 600 milligrams of a 1-hydrazino-phthalazine selected from the group consisting of 1-hydrazino-phthalazine, 1-hydrazino-4-methyl-phthalazine and 1,4-dihydrazino-phthalazine, and about 0.05 to about 5.0 milligrams indole alkaloid selected from the group consisting of reserpine, deserpidine and rescinnamine.

8. A pharmaceutical composition, in oral dosage unit form, comprising essentially about 10 to about 200 milligrams of 3-monocyclic carbocyclic aryl-lower alkyl-7-sulfamyl - 3,4-dihydro-2-H-[1,2,4]-benzothiadiazine - 1,1-dioxide, about 10 to about 600 milligrams of a 1-hydrazino-phthalazine selected from the group consisting of 1-hydrazino-phthalazine, 1-hydrazino-4-methyl-phthalazine and 1,4-dihydrazino-phthalazine, and about 0.05 to about 5.0 milligrams indole alkaloid selected from the group consisting of reserpine, deserpidine and rescinnamine.

9. A pharmaceutical composition, in oral dosage unit form, comprising essentially about 15 milligrams of 3-lower alkyl-6-chloro-7-sulfamyl-3,4-dihydro-2-H-[1,2,4]-benzothiadiazine-1,1-dioxide, about 25 milligrams of a 1-hydrazino-phthalazine selected from the group consisting of 1 - hydrazino - phthalazine, 1 - hydrazino - 4 - methyl-phthalazine and 1,4-dihydrazino-phthalazine, and about 0.1 milligram indole alkaloid selected from the group consisting of reserpine, deserpidine and rescinnamine.

10. A pharmaceutical composition, in oral dosage unit form, comprising essentially about 15 milligrams of 3-monocyclic carbocyclic aryl-lower alkyl-7-sulfamyl-3,4-dihydro-2-H-[1,2,4]-benzothiadiazine-1,1-dioxide, about 25 milligrams of a 1-hydrazino-phthalazine selected from the group consisting of 1-hydrazino-phthalazine, 1-hydrazino-4-methyl-phthalazine and 1,4-dihydrazino-phthalazine, and about 0.1 milligram indole alkaloid selected from the group consisting of reserpine, deserpidine and rescinnamine.

References Cited
UNITED STATES PATENTS 2,809,194  10/1957  Novello _____ 167—65

OTHER REFERENCES

Allen et al.: Proc. Staff. Meetings May Clinic. 29 (17) pp. 459–78, Aug. 25, 1954.

Drezner et al.: Int. Rec. of Medicine, 169 (5), pp. 253–61, May 1956.

Drug Trade News, 35 (5), page 56, Mfg. Sec., Mar. 7, 1960.

Ford: Southern Med. J., vol. 52, January 1959, pp. 40–5.

Freis et al.: Med. Annals Dist. Col., pp. 468 and 516, September 1957.

Freis et al.: J. Am. Med. Ass'n, 166 (2), pp. 137–40, Jan. 11, 1958.

J.A.M.A. Abstract, 154 (12), 1039–40, Mar. 20, 1954.

Ruffinelli et al.: J.A.M.A. 158:10, p 887, July 9, 1955.

ALBERT T. MEYERS, *Primary Examiner.*

SAN ROSEN, JULIAN S. LEVITT, *Examiners.*

LEROY B. RANDALL, *Assistant Examiner.*

Disclaimer 3,340,150.—*George de Stevens*, and *Lincoln Harvey Werner*, Summit, N.J. HYPERTENSIVE COMPOSITIONS. Patent dated Sept. 5, 1967. Disclaimer filed June 16, 1969, by the inventors; the assignee, *Ciba Corporation*, consenting.

Hereby disclaim the terminal portion of the term of the patent subsequent to Nov. 29, 1983.

[*Official Gazette October 28, 1969.*]

UNITED STATES PATENT OFFICE
CERTIFICATE OF CORRECTION

Patent No. 3,340,150　　　　　　　　　　　　　　　　　　September 5, 1967

George de Stevens et al.

It is certified that error appears in the above identified patent and that said Letters Patent are hereby corrected as shown below:

Column 14, lines 9 and 29, before "7", each occurrence, insert -- 6-chloro- --.

Signed and sealed this 21st day of April 1970.

(SEAL)
Attest:

Edward M. Fletcher, Jr.　　　　　　　　　　　　　WILLIAM E. SCHUYLER, JR.
Attesting Officer　　　　　　　　　　　　　　　　　Commissioner of Patents